(12) United States Patent
Hosseini et al.

(10) Patent No.: US 8,446,823 B2
(45) Date of Patent: May 21, 2013

(54) METHOD OF MANAGING THE FLOW OF TIME-SENSITIVE DATA OVER PACKET NETWORKS

(75) Inventors: Mojtaba Hosseini, Ottawa (CA); Patrick White, Renfrew (CA)

(73) Assignee: Magor Communications Corporation, Ottawa, On (CA)

( * ) Notice: Subject to any disclaimer, the term of this patent is extended or adjusted under 35 U.S.C. 154(b) by 962 days.

(21) Appl. No.: 12/489,977

(22) Filed: Jun. 23, 2009

(65) Prior Publication Data

US 2010/0321468 A1    Dec. 23, 2010

(51) Int. Cl.
*G08C 15/00* (2006.01)

(52) U.S. Cl.
USPC ........................................ 370/230.1; 370/468

(58) Field of Classification Search
USPC ................. 370/229–232, 235, 252, 400, 401, 370/431, 464–466, 468
See application file for complete search history.

(56) References Cited

U.S. PATENT DOCUMENTS

| | | | | |
|---|---|---|---|---|
| 5,805,983 A | * | 9/1998 | Naidu et al. | 455/67.16 |
| 5,912,644 A | * | 6/1999 | Wang | 342/457 |
| 2002/0181633 A1 | * | 12/2002 | Trans | 375/354 |
| 2010/0142638 A1 | * | 6/2010 | Jalali et al. | 375/260 |

* cited by examiner

*Primary Examiner* — Kerri Rose
(74) *Attorney, Agent, or Firm* — Marks & Clerk; Richard J. Mitchell

(57) ABSTRACT

A method is disclosed for managing multiple data streams transported over a common communications resource in a packet network, wherein data flowing through the resource travels in both directions, and wherein each stream is subject to data peaks. The round trip delay is determined for each data stream, and the transmission of data peaks in one or more of the data streams is delayed to at least reduce the degree of coincidence in the data peaks of different streams without increasing the maximum round trip delay for the data streams.

18 Claims, 3 Drawing Sheets

Fig 2 Video Conference Function Block Diagram

METHOD OF MANAGING THE FLOW OF TIME-SENSITIVE DATA OVER PACKET NETWORKS

FIELD OF THE INVENTION

This invention relates to the field of packet networks, and in particular to a method of managing the flow of time-sensitive data, such as voice or audio.

BACKGROUND OF THE INVENTION

It is becoming increasingly common to establish video conferencing sessions over IP networks rather than circuit-switched networks, such as ISDN. Such networks can, for example, be LANs, WANs, or virtual networks established over the Internet. In a typical session, a TCP/IP virtual connection is established between a pair of video endpoints, which can then communicate with each other to provide a telecollaboration session. The endpoints stream video and audio data to each other over other virtual connections (e.g. using RTP).

Video data is streamed over a network in compressed form and comprises two kinds of frames: P-frames and I-frames. P-frames are smaller in size than I-frames because the P-frames only contain information about the changes relative to a previous frame. For example, if an object moves over a static background, the P-frames only carry information pertaining to the movement of the object. On the other hand, when there is a change of scene, it is necessary to transmit the entire frame, and this is achieved with an I-frame. Because small data errors in P-frames can result in disproportionate degradation of received video, I-frames are also transmitted periodically to limit perpetuation of these data errors. Although the I-frame may be compressed internally, it is still much larger than a P-frame.

When multiple Video sources are streamed onto an IP network, I-frames occurring simultaneously create bandwidth or traffic peaks. As a result of the network internal congestion controls, which discard packets when congestion exceeds a certain threshold, the important I-frames may be discarded en route. This problem can occur when multiple video conference calls are in process and particularly in the case of multi-party conferences when the same video source is connected to two or more remote endpoints.

Existing stream buffers attempt overcome this problem by indiscriminately delaying arbitrary packets. This technique can result in undesirable latency in the video conference case. Another solution can be achieved at the endpoints if the users accept lower quality video, e.g. lower resolution and/or lower frame rate will be exchanged for more consistent, reliable performance.

SUMMARY OF THE INVENTION

According to the present invention there is provided a method of managing multiple data streams transported over a common communications resource in a packet network, wherein data flowing through said resource travels in both directions, and wherein each stream is subject to data peaks, comprising determining a round trip delay for each data stream; and delaying transmission of data peaks in one or more of said data streams to at least reduce the degree of coincidence in the data peaks of different streams without increasing the maximum round trip delay for the data streams.

By measuring the Round Trip Delay (RTD) for each video connection, data associated with connection(s) having the least RTD are delayed to smooth net traffic. This will result in zero delay to the connection having greatest RTD. The effect of this, other factors being equal, is to ensure that no party in a multiparty conference will experience RTD greater than would be experienced by parties communicating via the path of greatest point to point delay when all other connections are disconnected.

As the number of connections is increased traffic peaks from each source will preferably be distributed as evenly as possible to minimize the probability of traffic loss due to bandwidth caps in each transmission paths. Such caps are considered to have essentially unknown clipping characteristics that will significantly deteriorate video rendered at the endpoint equipment.

According to another aspect of the invention there is provided a de-synchronizer for reducing packet loss in a packet network wherein multiple data streams are transported over a common communications resource, wherein data flowing through said resource travels in both directions, and wherein each stream is subject to data peaks, comprising an interface for communicating with transmitters and receivers for said data streams; and a processor configured to issue signals, in response to reported round trip delays for the data streams, delaying transmission of data peaks in one or more of said data streams so as to at least reduce the degree of coincidence in the data peaks of different streams without increasing the maximum round trip delay for the data streams.

In a still further aspect of the invention there is provided a video conference apparatus, comprising at least one video source; at least one transmitter for transmitting a transmitted video signal from said at least one source as a data stream; at least one receiver for receiving a data stream and outputting a received video signal; at least one display unit for displaying received a received video signal; and a processor responsive to round trip delays for the data streams reported by said receivers to delay transmission of data peaks in one or more of said data streams so as to at least reduce the degree of coincidence in the data peaks of different streams without increasing the maximum round trip delay for the data streams.

BRIEF DESCRIPTION OF THE DRAWINGS

The invention will now be described in more detail, by way of example only, with reference to the accompanying drawings, in which:—

DETAILED DESCRIPTION OF PREFERRED EMBODIMENTS

Figure 1:
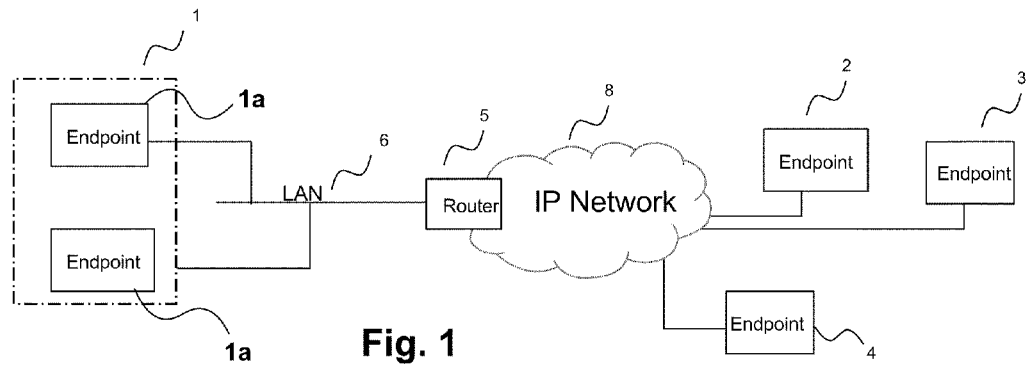
FIG. 1 is a schematic diagram of a typical video conferencing system.

FIG. 1 illustrates a part of a typical video conference system. Endpoints 1a at location 1 are connected to endpoints locations 2, 3 and 4 at different locations. The endpoints 1a and 1b are connected via LAN 6 to router 5, which connects to IP network 8, to which the endpoints 2, 3, 4 are also connected. An important point to realize is that there is a point-to-point IP connection set up between each source and each destination endpoint. In the example shown, there are three IP connections to the router 5 shown at the edge of the IP Network 8. The router 5 is typical of many in each IP connection. The IP Network shown could be, for example, a corporate private network, the public Internet, or a combination of such networks.

Figure 3:
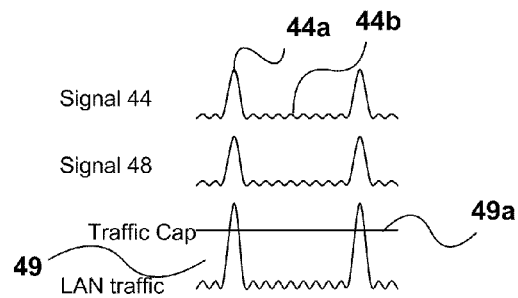
FIG. 3 is illustrates a typical video signal in the prior art.

A typical stylized IP Video Signal 44 is illustrated in FIG. 3. Larger peaks 44a represent periods of high data traffic associated with video I-frames transmitting the entire picture. Smaller traffic peaks 44b represent P-frames, transmitting small fragments of the picture, which have changed with respect to the previous I and P-frames, and other data. The signal shown in FIG. 3 reflects a typical one to two second period.

Each video connection in FIG. 1 carries a signal similar to that shown in FIG. 3. In the case where the signal from one common video source is transmitted to two destinations, the signal traffic to each destination will be similar; for example, signal 44 and signal 48. These are signals transmitted on a virtual IP connection.

FIG. 3 shows aggregate traffic on the real, physical, LAN 6. In general, the video data from different sources are not synchronized, which means that there is no particular temporal relationship between traffic peaks resulting from the various I-frames coming from different sources. These peaks from different sources will drift with respect to one another when viewed over time but they will always coincide if the same source streams to multiple destinations. From time to time drifting I-frame peaks will coincide again resulting in a signal similar to that shown at 49 in FIG. 3. When the traffic peaks on each of the connections to multiple destinations roughly coincide it is possible that the instantaneous traffic level may exceed the traffic capacity of one of more devices (e.g. router 5 in FIG. 1) in the system. This capacity limit is shown as a cap 49a in FIG. 3. The router 5 typically discards any data, which would otherwise have exceeded the cap. The consequence of this loss of data is a degradation of the transmitted picture when it is rendered at the display for a period of time that is noticeable and significant to the system users.

In a one-way video application, for example, a YouTube video, if the video signal is delayed a few hundred ms or even several seconds, users likely will either not notice or not be too concerned. Such delay typically occurs once at the point the user starts watching the video and has no perceivable effect to the viewer on the remainder of that video.

Unlike streaming one-way video applications, round trip delay (RTD) is a very important parameter in a videoconference system. A video conference is a two-way communication, like a telephone call. Human communication evolved in an environment in which the delay in sound traveling from a speaker's mouth to a listener's ear is typically a few ms. to human perception this is instantaneous. Visual cues are received even faster. It has been found that communication can continue naturally when the RTD is kept under approximately 150 ms. Between this figure and 500 or 600 ms users will find conversation increasingly difficult, especially, for example, if discussion is heated or users are in negotiation.

As it relates to video, RTD is the time taken from the moment an individual at the source moves or makes a gesture until that movement occurs on the distant display plus the time taken for a similar movement at the distant location to occur on the local display. Each way this includes typically time taken to scan the scene, encode it, packetize it, traverse the IP network and carry out the inverse functions at the display end, where further delay is incurred in a jitter buffer. It is extremely difficult if not impossible with current technology and user desired picture quality to meet the ideal RTD requirements. It will be clear that arbitrarily adding further delay to smooth traffic using a video buffer will further deteriorate the user experience.

Figure 2:
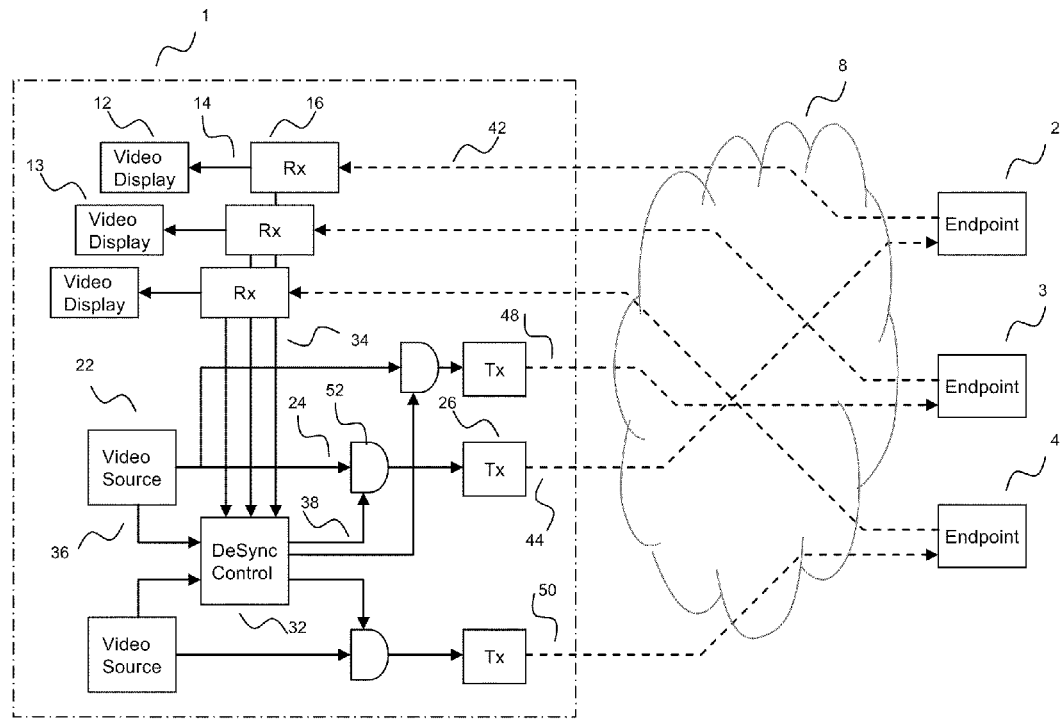
FIG. 2 is a functional block diagram of a video conferencing system.

FIG. 2 is a functional block diagram of a system in accordance with one embodiment of the invention. With the exception of the DeSync Control block 32 and delay blocks 52, whose function will be described in more detail below, the function of the remaining blocks is known in the art. The video displays 12 and 13 could be a dedicated device, such as may be found in a typical conference room or a window on a display more typically found at an individuals desk.

Network Receiver 16 terminates the IP connection 42 from a remote source at endpoint 2 and delivers the digital video signal 14 to the display 12. Video Source 22 could be a video camera, a group of switched cameras, or any other source of video including a Video Player, Multiparty Conference Unit (MCU), or a Gateway connection to legacy video equipment. Network Transmitter 26 converts the digital video signal 24 from the source and sends it as an IP signal 44 to the remote endpoint 2.

Figure 7:
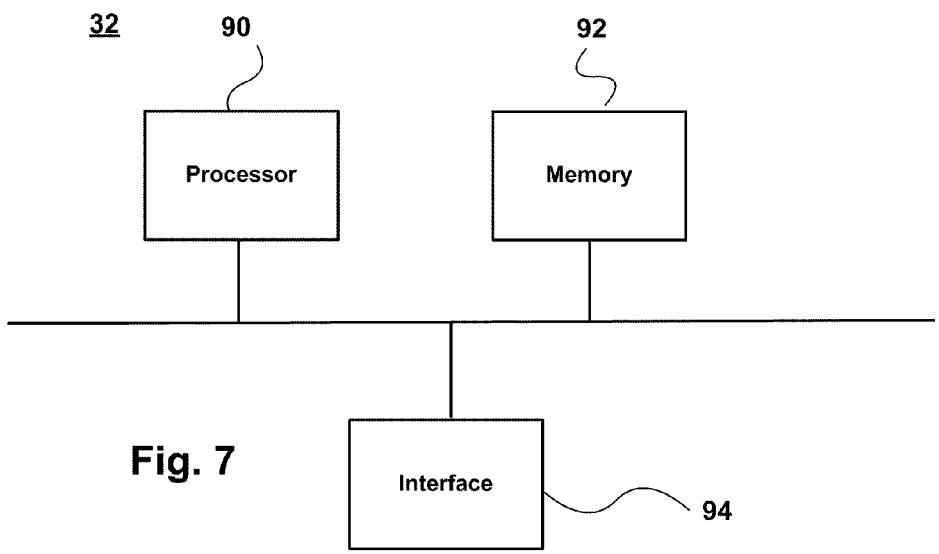
FIG. 7 is a high-level block diagram of a desynchronizer.

Desynch block 32, shown in FIG. 7, comprises a processor 70, memory 72, and interface 74 for interfacing with transmitters 26 and receivers 16.

The blocks shown illustrate functions that may be physically integrated with each other and/or other equipment (not illustrated). For example displays 12 and 13 may be simply two windows on a single display or they may be separate standalone displays. At remote locations details, similar to 1 with or without blocks 32 and 52, of video encoding and decoding and IP transmission and reception are omitted for clarity.

The endpoints 1 and 2, 3, 4 are interconnected via the IP network 8, which is understood to include all equipment necessary for IP connectivity between the locations. In particular, the network will include many routers, similar to 5 shown and other equipment. This other equipment may be at the respective location and/or part of a private network, a public network, especially the Internet. It will be understood that signals traversing the network are subject to significant arbitrary and variable delay ranging from tens of milliseconds to seconds.

Connections 42 and 44 form one logical two-way connection (IP virtual connections are illustrated as dashed lines to differentiate from other signals). It will be understood that these connections comprise more than one signal. These signals include both the video signal (e.g. carried in Real Time Protocol—RTP) and round trip delay (RTD) information on the RTP flow (e.g. derived from RTP Control Protocol RTCP)

Referring again to FIG. 3, it will be seen that the peaks associated with I-frames are aligned and when aggregated onto the LAN they result in a 2× traffic peak. It should be noted that in the example peaks necessarily line up because a single encoder is used. However had there been two independent video sources with two encoders the same situation would arise periodically as the two signals drift in and out of phase. Each time they come into phase a large traffic peak is created resulting potentially in data loss around the peak as described earlier.

The deSync control 32, shown in FIG. 2, receives signals 34 from each Receiver (Rx) block 16 (two or more) indicative of Round Trip Delay (RTD), which information is derived from a network protocol (e.g. RTCP) in the IP Transport layer.

Signals 36 from each controlled video source 22 are indicative of the time the last I-Frame was transmitted in video signal 24.

The purpose of the desync function is to delay the transmission of the signal transmitted on certain connections in order to minimize aggregate traffic peaks whilst at the same time not increasing RTD of any connection beyond the greatest undelayed RTD for all connections. This is achieved by signal 38.

The network transmitter 26 is preceded by the addition of a delay block 52 at the video input. Block 52 delays signal 24 by a time specified in signal 38. The result is that the IP signal 48 is delayed by block 52 by the value specified in signal 38 when compared to conventional endpoints. It will be understood that this modification may or may not be embedded within the existing transmitter code.

The deSync control 32 determines the delay of each stream so as to separate peaks that would otherwise coincide. It does so by delaying streams with the least RTD more than those with higher RTD such that the stream with the highest RTD is not delayed at all. The amount of delay per stream also has a maximum value so as to cap the total delay.

Figure 4:
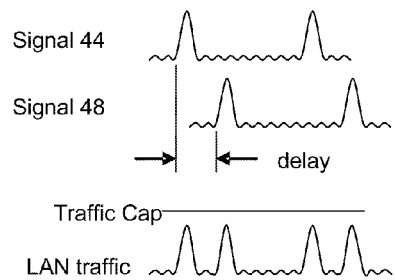
FIG. 4 illustrates a video signal with de-synchronization applied in accordance with one embodiment of the invention.

FIG. 4 illustrates the result of the implementing a controlled delay as described and should be compared with FIG. 3. In this example it is assumed that connection 44 has the greatest RTD and no further delay has been added to this signal. A delay is, according to the invention, applied only to the signal driving connection 48 so that its I-frame peaks do not align with signal 44. The peaks in the resultant aggregate LAN traffic therefore do not exceed the arbitrary traffic cap as they do in FIG. 3.

Figure 5:
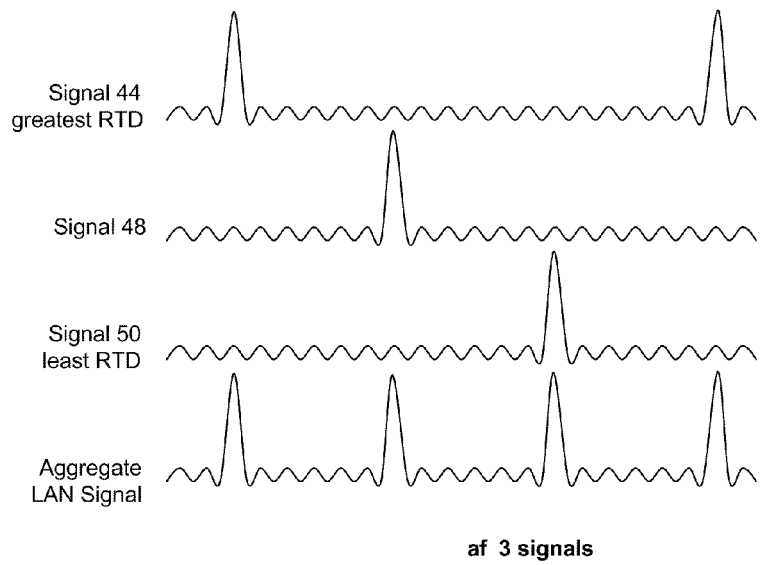
FIG. 5 illustrates the case for three video three signals.

It will be understood that this method may be used for any number of connections. FIG. 5 illustrates the operation of the invention more generally. In this case three video signals 44, 48, and 50 are being transmitted simultaneously. The deSync function will attempt to distribute I-frame peaks in signals 48 and 50 between successive peaks of Signal 44 which is the un-delayed Signal on the connection with the greatest RTD.

However, in practice I-frame transmission is not strictly periodic and the round trip delay experienced by each connection may change over time. This change may result in the rank order of connections by RTD changing. The connection with the greatest delay at one moment may be replaced by a different connection at a later moment.

Figure 6:
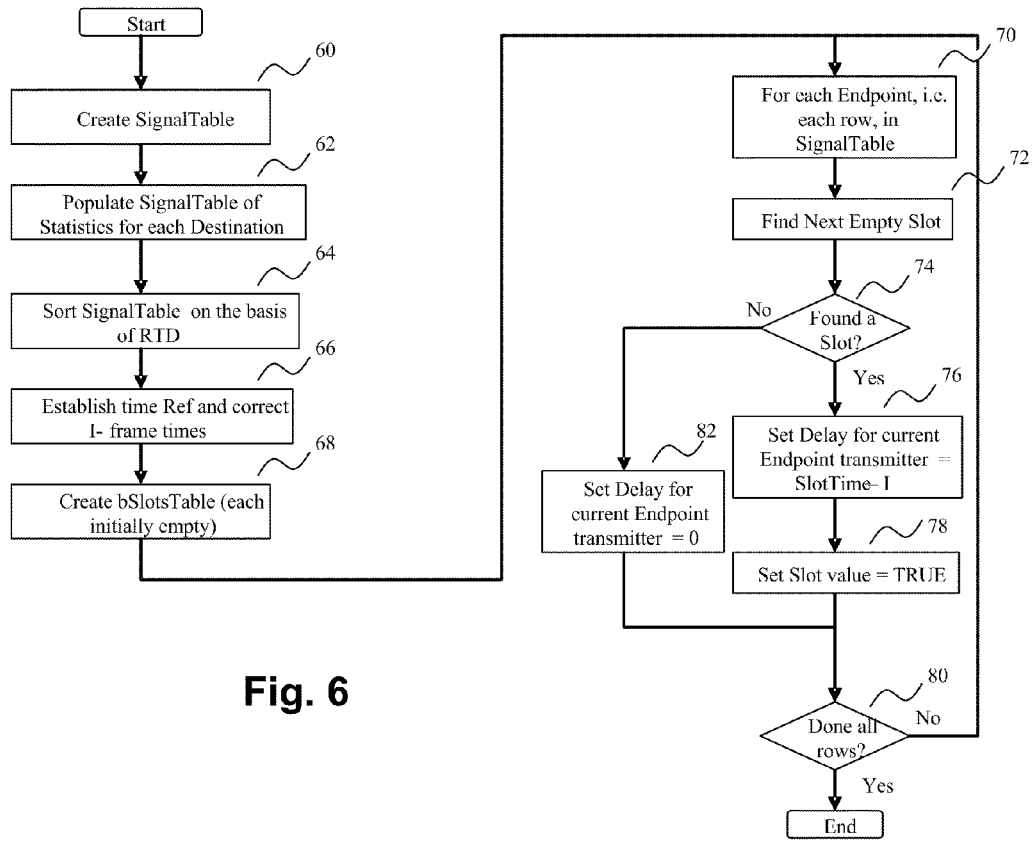
FIG. 6 is a flow chart showing the operation of the desynchronizer.

FIG. 6 shows a simplified flow chart of embodiment of the desynchronizing control unit 32. However, it will be appreciated that there a numerous alternative ways of implementing the described function, which will be apparent to a person skilled in the art. In this exemplary embodiment, the process described in the flow chart shown in FIG. 6 is executed on a schedule once every 9-10 seconds.

The first step in the process 60 is to create an empty SignalTable in computer memory. The table contains a row for each destination endpoint currently active. It contains the two columns:
1. Last I-frame time (I) for the destination
2. Current Round Trip Delay (RTD) for the destination In step 62 the SignalTable is populated with data from the Network Receivers 16 and the video sources 22 as described earlier.

It will be understood that the round trip delay reported by receivers 16 reflects only the delay in the network, the total for outbound path plus return path, and does not include any additional delay introduced in the endpoint as a result of this invention, either at the subject endpoint or the remote endpoint, if the invention is implemented in any or all the remote endpoints 2, 3 and 4.

It will be understood that the time stamp signal 36 indicating the last I-frame from a given video source 22 will be relative to a common arbitrary real time clock.

In the next step 64, the SignalTable is sorted on the basis of the RTD column in descending order. In step 66 the time reference (Ref) for the purposes of the rest of the process steps is established. It is taken to be the time of the last I-frame for the video source feeding the connection with the longest RTD, i.e. the first entry in the SignalTable column I.

Further each I value in the SignalTable, except the first, is adjusted. It will be understood that I values are roughly periodic. The I values are adjusted by adding or subtracting the I-frame period to I such that I now has a value greater than Ref but not exceeding I+Ref.

Next in 68 a table of time slots is created, bSlotsTable. Initially each entry is FALSE. The period into which I-frames could be potentially delayed is divided into "slots", at least as many slots as there are endpoints. Each entry in the bSlotsTable corresponds to one slot, each having a different associated SlotTime. In the preferred embodiment slots are evenly spaced in time so that the SlotTime is proportional to the slot number.

The remaining loop determines a delay value for each destination (row) which will result in moving all but one of any coincident I-frames to an empty slot, so that no slot has more than one I-frame in it.

Because the destination with greatest RTD is taken as reference, it will be evident that it will not be further delayed by this process.

Steps 70 and 80 control a typical software loop processing one row of the table, i.e. one destination, in each loop.

In the first step of the loop 72, the next empty slot that is no more than the maximum allowable delay ahead in time is found, i.e. slot having a SlotTime value greater than or equal to the I value but no more than the maximum allowable delay ahead in time. Under certain circumstances it is possible that such a slot may not be found.

A test 74 selects the subsequent step on the basis of whether an empty slot was found in 72.

Typically a slot is found and step 76 sets the delay 38 (the specific signal connected to the transmitter 26 of the current loop destination). It is set to a value equal to the SlotTime-I. Following this 78 the slot value in bSlotsTable is set TRUE so that this slot will not again be chosen in step 72 when finding a slot for the remaining destinations in SignalTable.

In the event that no slot is found for this endpoint the delay 38 for that endpoint transmitter is set to zero in step 82, i.e. no delay.

Step 80 is the end of the loop. The flowchart either loops back to 70 or ends when all destination have been processed.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

We claim:
1. A method of managing multiple data streams transported through a common communications resource in a packet network, wherein data flowing through said resource travels in both directions, and wherein each stream is subject to data peaks, comprising:
  establishing logical two-way connections through the common communications resource between one or more near endpoints and one or more far endpoints,
  determining an undelayed round trip delay for each said logical two-way connection,
  determining the maximum round trip delay among all said logical two-way connections,
  preparing each of said data streams for transmission over respective said logical connections from a said near endpoint to a said far endpoint,
  determining the location of said data peaks in said data streams,
  transmitting said data streams over said respective logical two-way connections to said one or more far endpoints, and
  delaying the transmission of one or more of said data streams that are transmitted over a said logical two-way connection having an undelayed round trip delay less than the maximum round trip delay by an amount dependent on the location of said peaks to reduce the degree of coincidence in the data peaks of different streams without increasing the maximum round trip delay for the logical two-way connections.

2. A method as claimed in claim 1, wherein the transmission of said data streams is delayed so as to remove any coincidence in said data peaks of different data streams.

3. A method as claimed in claim 1, wherein the delays introduced into the different data streams are ranked in accordance with the determined round trip delays for each logical two-way connection.

4. A method as claimed in claim 3, wherein the amount of delay that can be introduced into a data stream is capped at a predetermined value.

5. A method as claimed in claim 3, wherein the round trip delays are monitored over a period of time, and the rank order is changed as necessary to take into account changing round trip delays.

6. A method as claimed in claim 3, wherein the delays are introduced so as to evenly distribute the data peaks in different streams.

7. A method as claimed in claim 1, wherein the logical connections are established between a common source endpoint and multiple destination endpoints.

8. A method as claimed in claim 1, wherein said data streams represent video streams and said data peaks correspond to I-frames.

9. A method as claimed in claim 8, wherein a period within which the I-frames from all the streams are present is identified, said period is divided into a plurality of timeslots at least equal in number to the number of data streams, and said I-frames from the different data streams are distributed over said timeslots.

10. A de-synchronizer for reducing packet loss in a packet network wherein multiple data streams are transported over respective logical two-way connections through a common communications resource between one or more near endpoints and one or more far endpoints, and wherein each data stream is subject to data peaks, comprising:
  an interface for communicating with transmitters and receivers for said data streams; and
  a processor responsive to reported round trip delays for the logical two-way connections to determine the maximum round trip delay among all the logical two-way connections, said processor further being responsive to signals indicating the location of data peaks in said data streams to issue signals delaying transmission of one or more of said data streams over said logical two-way connections having a round trip delay less than the determined maximum round trip delay by an amount dependent on the location of said peaks so as to reduce the degree of coincidence in the data peaks of different data streams without increasing the maximum round trip delay for the logical two-way connections.

11. A de-synchronizer as claimed in claim 10, wherein the processor is configured to delay said data streams so as to remove any coincidence in said data peaks of different streams.

12. A de-synchronizer as claimed in claim 10, wherein said processor is configured to introduce delays into the different data streams that are ranked in accordance with the round trip delays for each data stream.

13. A de-synchronizer as claimed in claim 12, wherein the processor is configured to monitor the round trip delays over a period of time and change the rank order as necessary to take into account changing round trip delays.

14. A de-synchronizer as claimed in claim 10, wherein the processor is configured to cap the amount of delay that can be introduced into a data stream at a predetermined value.

15. A de-synchronizer as claimed in claim 10, wherein the processor is configured to introduce delays so as to evenly distribute the data peaks in different streams.

16. A de-synchronizer as claimed in claim 10, wherein said data streams represent video streams and said data peaks correspond to I-frames.

17. A de-synchronizer as claimed in claim 16, further comprising a memory storing a table containing a number of timeslots at least equal to the number of datastreams, and wherein said processor is configured to distribute said I-frames from the different data streams over said timeslots.

18. A video conference apparatus, comprising:
  a plurality of video sources;
  a plurality of transmitters for transmitting video signals from said video sources as multiple data streams over respective logical two-way connections through a common communications resource between said video sources and one or more far endpoints, and wherein each data stream is subject to data peaks corresponding to I-frames in the video signals;
  a plurality of receivers for receiving multiple data streams and outputting received video signals;
  a plurality of display units for displaying received the received video signals; and
  a de-synchronizer comprising:
    an interface for communicating with said transmitters and receivers for said data streams; and
    a processor responsive to round trip delays for the logical two-way connections reported by the receivers to determine the maximum round trip delay among all the logical two-way connections, said processor further being responsive to signals indicating the location of I-frames in said data streams to issue signals delaying transmission of one or more of said data streams over said logical two-way connections having a round trip delay less than the determined maximum round trip delay by an amount dependent on the location of said I-frames so as to reduce the degree of coincidence in the I-frames of different data streams without increasing the maximum round trip delay for the logical two-way connections.

* * * * *